United States Patent [19]

Rocquin

[11] 4,376,367

[45] Mar. 15, 1983

[54] RAKE

[76] Inventor: Elsas L. Rocquin, P.O. Box 626, Ponchatoula, La. 70454

[21] Appl. No.: 315,941

[22] Filed: Oct. 28, 1981

[51] Int. Cl.³ .............................................. A01D 7/08
[52] U.S. Cl. ................................................. 56/400.17
[58] Field of Search ........... 56/400.17, 400.18, 400.16, 56/400.1, 400.2

[56] References Cited

U.S. PATENT DOCUMENTS

| | | | |
|---|---|---|---|
| 2,030,183 | 2/1936 | Rocquin | 56/400.18 |
| 2,087,499 | 7/1937 | Borovicha | 56/400.17 |
| 2,313,691 | 3/1943 | Whittenberger | 56/400.17 |
| 2,463,393 | 3/1949 | Key | 56/400.17 |
| 2,587,424 | 2/1952 | Zeman | 56/400.17 |

Primary Examiner—Jay N. Eskovitz
Attorney, Agent, or Firm—Diller, Ramik & Wight

[57] ABSTRACT

A flexible tine garden rake has a cross arm to which individual tines are attached, the attachments being effected by a retainer strip which is slip-fitted within a channel. The tines have end portions extending crosswise into the channel and terminating in hooks conforming to the interior surface of the channel and lie upon and are backed up by a laterally projecting surface of the cross arm so that the tines are stiffened and are anchored so as to avoid highly localized stress concentration when flexed incidental to normal use.

11 Claims, 4 Drawing Figures

U.S. Patent  Mar. 15, 1983  4,376,367
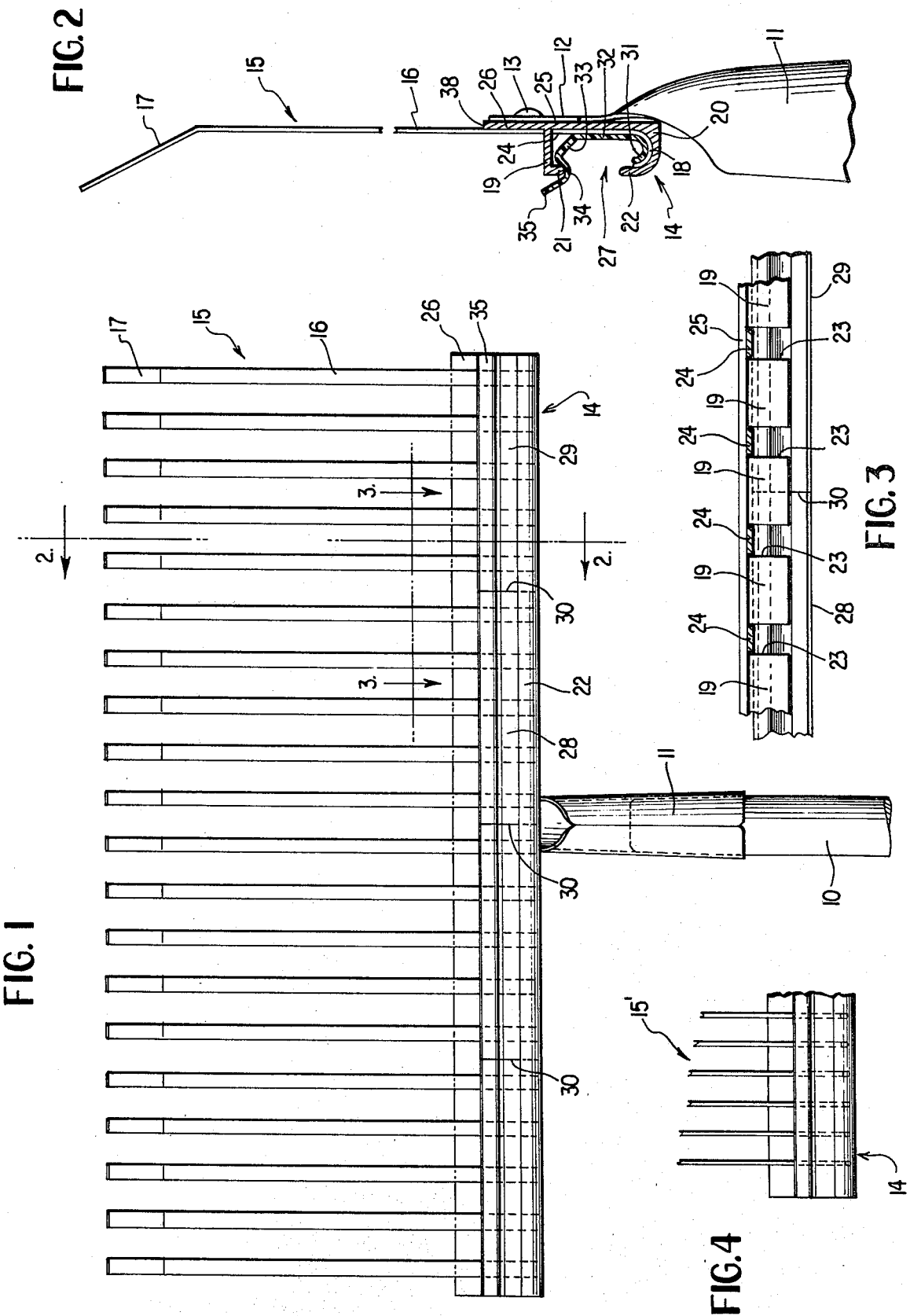

RAKE

BACKGROUND OF THE INVENTION

This invention is concerned with garden rakes in general and in particular is concerned with flexible tine rakes of the type wherein a plurality of individual and separate tines are secured in a cross arm at the end of a rake handle. Rakes of this type have been in existence for many years and in perhaps the earliest form, the tines are fanned out from a common anchoring point and are braced intermediate their ends. In such a construction, if a tine breaks, it cannot be replaced and, accordingly, numerous efforts have been made to provide such general form of a rake but wherein the individual tines may be replaced, when necessary, thereby substantially to prolong the effective lifetime of the rake assembly. However, such prior art devices always have, to my knowledge, required separate and special fastening elements and devices so that the removal and replacement of individual tines is a relatively complex procedure and which requires the utilization of tools to do so.

BRIEF SUMMARY OF THE INVENTION

Accordingly, it is of primary concern in connection with the present invention to provide an improved garden rake of the type generally described hereinabove wherein the individual and separate tine elements which can be easily removed and replaced without the aid and necessity for special tools.

More particularly, the present invention is concerned with an improved flexible tine rake of the type having a handle with a cross arm attached thereto and to which the flexible tines are secured by means of a strip-like retainer means removably received in a channel of the cross arm, the retainer means being effective to anchor end portions of the tines within the channel but be easily slip-fitted into and out of the channel correspondingly into and out of anchoring relationship with respect to the tines.

A further object of the invention is to provide an improved flexible tine rake of the type specified wherein the ends of the tines are of generally hook or J-shaped configuration so as to conform generally to adjacent contours of the channel and wherein the retainer means are seated in such hooks. It is further contemplated within the purview of this invention that the retainer means be somewhat resilient so as to "give" to some degree to accommodate for flexing of the tines during normal usage thereof and thereby to avoid highly localized stress concentration due to the flexing or bending of such tines, thereby greatly prolonging the life of the individual tines.

It is further an object of this invention to provide an improved form of garden rake of the flexible tine variety as described hereinabove wherein the cross arm is provided with a lateral extension which backs up the tines immediately adjacent their anchored end portions, thereby to stiffen the tines and also to cooperate with the aforesaid retainer means to distribute the bending reaction of the anchored ends of the tines over a goodly portion of their lengths to thereby prolong the lives of the individual tines.

The above and other objects will become more apparent in light of the following detailed description.

BRIEF DESCRIPTION OF THE DRAWING FIGURES

FIG. 1 is a plan view of an improved rake construction according to the present invention;

FIG. 2 is a transverse section taken generally along the plane of section line 2—2 in FIG. 1;

FIG. 3 is an enlarged partial section taken substantially along the plane of section 3—3 in FIG. 1; and FIG. 4 is a partial plan view of a modification of the invention.

DETAILED DESCRIPTION OF THE INVENTION

In the specific embodiment illustrated in FIGS. 1-3 inclusive, the rake handle is indicated by the reference character 10 and as is conventional, slip-fitted into a ferrule 11 or similar socket which has a flattened end portion 12 secured as by a rivet or like fastener 13 to the cross arm assembly indicated generally by the reference character 14, the cross arm assembly 14 serving to mount the individual and separate tine elements indicated generally by the reference character 15. Each tine of the set 15 may be constructed as shown best in FIG. 2, to include an elongate main body portion 16 of flat, strip-like form and terminating at its ground engaging end in an angularly directed working portion 17 whereas the opposite end of the tine is formed into a hook 18 of generally J-shaped configuration, substantially as is shown. The cross arm 14 is provided with longitudinally extending and upstanding side walls 19 and 20, each of which terminates in an overhanging edge portion such as those indicated by the reference characters 21 and 22. The inner surface of the side wall 19 and its overhanging edge portion 21 is rather sharply angulated as shown whereas the inner surface of the side wall 20 and its associated overhanging edge 22 is curvilinear so that the J-shaped hooked end portion 18 of the tines fit in rather close conformity therewith.

As is shown best in FIG. 3, the side wall 19 is provided with a series of slots 23 which are of widths just sufficient to clear the widths of tines 15, the side wall 19 being of interrupted form by virtue of the existence of such slots, substantially as is shown in FIG. 3.

FIG. 3 also illustrates very well that the attaching ends 24 of the tines pass through the slots 23 so as to lie substantially flush against the main web portion 25 of the cross arm 14. Correspondingly, FIG. 2 illustrates that these same portions 24 of the tines 15 also lie in face-to-face contact normally with the extension 26 of such main web 25 which projects laterally beyond the stated interrupted side wall 19.

The retaining means for the tines is in the form of a plurality of channel-like locking strips disposed in end-to-end slip-fitted relation within the channel 27 defined by the interior surfaces of the side walls 19 and 20 and their associated overhanging edge portions 21 and 22. FIG. 3 shows more clearly two such retaining members 28 and 29 which are disposed in end-abutted relationship at 30.

FIG. 2 illustrates more particularly the crossectional configuration of each of such retainer channels or strips. As illustrated, each strip has a J-shaped or arcuate side edge portion 31, a relatively flat web 32 joined therewith, and angulated portion 33, a reverse curved portion 34 and, lastly, the angulated side edge 35, substantially as is shown. Each strip is dimensionally constructed so as to fit snugly within the channel 27 substantially as is shown in FIG. 2 while having its arcuated side wall 31 seated within the J-shaped hook end portion 18 of the tines associated therewith and with the reversely curved portion 34 seating in the overhanging edge 21. In this way, each tine is held snugly in place as shown in FIG. 2, in a normal configuration. During the course of normal usage, the tines are flexed backwards and it is a particular feature of this invention that the portion 26 of the cross arm backs up the tines close to their attached or anchored end portions so as to stiffen them and, at the same time, to prevent the concentration of bending stresses at highly localized portions of the tines, thereby to increase their longevity. The retaining strips are preferably somewhat resilient so that whereas they snugly hold the tines in place, they do not clamp them so tightly as to provide the localization of stresses as would otherwise be the case. That is to say, the strips "give" to some slight degree during normal flexure of the tines 15 so that the anchored end portions of the tines, lying inwardly of the free edge 38 of the cross arm portion 26 can move, arch or otherwise form to avoid heavy localized stress concentrations as aforesaid.

On the other hand, the projecting angulated edges 35 of the retaining strips presents a portion thereof which is easily grasped by the user's fingers to aid in the sliding of these strips within the channel 27 to permit removal and replacement of a tine. To this end, it will be noted that it is not essential to completely remove any of the retaining strips to replace a given tine. For example, if a tine at the extreme right-hand end of FIG. 1 is broken or damaged, all of the retainer strips may be slid slightly to the left until the anchored end portion of that tine is exposed, whereafter the tine can be removed and a new tine placed in position and then the entire retaining strip assembly slid to the right to re-anchor that tine as well as the remaining tines. On the other hand, an intermediate tine may be reached by spreading apart adjacent retaining strips 28, 28, etc. The slots 23 in the side wall 19 of the cross arm also aid in this ease of removal and replacement and, as well, the slots allow the aforesaid "arching" or slight movement of the body portions 24 of the tines 15 to avoid stress concentration and, to this end, the angulated portion 33 of the retainer strips provide sufficient clearance for this action to take place.

Although only a preferred embodiment of the invention has been specifically illustrated and described herein, it is to be understood that minor variations may be made in the apparatus without departing from the spirit and scope of the invention, as defined in the appended claims.

What is claimed is:

1. A flexible tine rake having a handle with a cross arm attached thereto and a plurality of flexible tines carried by said cross arm, the improvement wherein:
said cross arm is of generally channel-shaped form in cross section, said tines having end portions projecting into and within the channel section so as to lie across the bottom thereof, and retainer means removably received in the channel for anchoring said end portion of the tines therewithin whereby individual tines may be removed and replaced without the aid of tools, one side of said channel section being slotted to receive said tines, the ends of the tines within the channel being hooked to conform with the channel contour and said retainer means being resilient to allow the tines to flex over substantial portions of their lengths, inclusive of within the channel.

2. A flexible tine rake as defined in claim 1 wherein the channel is defined in part by upstanding side walls terminating in overhanging edge portions, the retainer means being lockingly engaged with the edge portion of one of said side walls.

3. A flexible tine rake as defined in claim 1 wherein said cross arm includes a base and upstanding side walls on said base defining the channel, and said base extending laterally beyond one side wall to present a backing surface, said tines projecting through said one side wall and engaging said backing surface to project therebeyond so that the free ends of the tines are free to flex in use.

4. A flexible tine rake having a handle with a cross arm attached thereto and a plurality of flexible tines carried by said cross arm, the improvement wherein:
said cross arm is of generally channel-shaped form in cross section, said tines having end portions projecting into and within the channel section so as to lie across the bottom thereof, and retainer means removably received in the channel for anchoring said end portion of the tines therewithin whereby individual tines may be removed and replaced without the aid of tools, said cross arm including a base and upstanding side walls on said base defining the channel, and said base extending laterally beyond one side wall to present a backing surface, said tines projecting through said one side wall and engaging said backing surface to project therebeyond so that the free ends of the tines are free to flex in use, said one side wall being slotted to receive said tines, the ends of the tines within the channel being hooked to conform with the channel contour and said retainer means being resilient to allow the tines to flex over substantial portions of their lengths, inclusive of within the channel.

5. A flexible tine rake having a handle with a cross arm attached thereto and a plurality of flexible tines carried by said cross arm, the improvement wherein:
said cross arm is of generally channel-shaped form in cross section, said tines having end portions projecting into and within the channel section so as to lie across the bottom thereof, and retainer means removably received in the channel for anchoring said end portion of the tines therewithin whereby individual tines may be removed and replaced without the aid of tools, the channel being defined in part by upstanding side walls terminating in overhanging edge portions, the retainer means being lockingly engaged with the edge portion of one of said side walls, said one side wall being slotted to receive said tines, the ends of the tines within the channel being hooked to conform with the channel contour and said retainer means being resilient to allow the tines to flex over substantial portions of their lengths, inclusive of within the channel.

6. A flexible tine rake as defined in claim 1 wherein said retainer means comprises at least one strip of synthetic resinous material, said strip being of cross sectional shape generally conforming to the interior surface of the channel and being snugly received therein so as to be held in place by friction.

7. A flexible tine rake as defined in claim 6 wherein each of said end portions of the tines terminates in a hook generally conforming to an adjacent contour of the channel and said strip terminating at one side edge in a shape snugly fitting within such hooks so as to sandwich them against the channel.

8. A flexible tine rake as defined in claim 7 wherein said cross arm includes a base and upstanding side walls on said base defining the channel, and said base extending laterally beyond one side wall to present a backing surface, said tines projecting through said one side wall and engaging said backing surface to project therebeyond so that the free ends of the tines are free to flex in use.

9. A flexible tine rake as defined in claim 6 wherein said cross arm includes a base and upstanding side walls on said base defining the channel, and said base extending laterally beyond one side wall to present a backing surface, said tines projecting through said one side wall and engaging said backing surface to project therebeyond so that the free ends of the tines are free to flex in use.

10. A flexible tine rake having a handle with a cross arm attached thereto and a plurality of flexible tines carried by said cross arm, the improvement wherein:

said cross arm is of generally channel-shaped form in cross section, said tines having end portions projecting into and within the channel section so as to lie across the bottom thereof, and retainer means removably received in the channel for anchoring said end portion of the tines therewithin whereby individual tines may be removed and replaced without the aid of tools, said retainer means comprising at least one strip of synthetic resinous material, said strip being of cross sectional shape generally conforming to the interior surface of the channel and being snugly received therein so as to be held in place by friction, said cross arm including a base and upstanding side walls on said base defining the channel, and said base extending laterally beyond one side wall to present a backing surface, said tines projecting through said one side wall and engaging said backing surface to project therebeyond so that the free ends of the tines are free to flex in use, said one side wall being slotted to receive said tines, the ends of the tines within the channel being hooked to conform with the channel contour and said retainer means being resilient to allow the tines to flex over substantial portions of their lengths, inclusive of within the channel.

11. A flexible tine rake having a handle with a cross arm attached thereto and a plurality of flexible tines carried by said cross arm, the improvement wherein:

said cross arm is of generally channel-shaped form in cross section, said tines having end portions projecting into and within the channel section so as to lie across the bottom thereof, and retainer means removably received in the channel for anchoring said end portion of the tines therewithin whereby individual tines may be removed and replaced without the aid of tools, said retainer means comprising at least one strip of synthetic resinous material, said strip being of cross sectional shape generally conforming to the interior surface of the channel and being snugly received therein so as to be held in place by friction, each of said end portions of the tines terminating in a hook generally conforming to an adjacent contour of the channel and said strip terminating at one side edge in a shape snugly fitting within such hooks so as to sandwich them against the channel, said cross arm including a base and upstanding side walls on said base defining the channel, and said base extending laterally beyond one side wall to present a backing surface, said tines projecting through said one side wall and engaging said backing surface to project therebeyond so that the free ends of the tines are free to flex in use, said one side wall being slotted to receive said tines, the ends of the tines within the channel being hooked to conform with the channel contour and said retainer means being resilient to allow the tines to flex over substantial portions of their lengths, inclusive of within the channel.

* * * * *